United States Patent [19]

Couillaud et al.

[11] Patent Number: 4,862,469
[45] Date of Patent: Aug. 29, 1989

[54] SUPPRESSION OF THE SECOND INTRACAVITY PULSE IN A SYNCHRONOUSLY PUMPED DYE LASER

[75] Inventors: Bernard Couillaud, Palo Alto; Gerald M. Mitchell, Cupertino, both of Calif.

[73] Assignee: Coherent, Inc., Palo Alto, Calif.

[21] Appl. No.: 917,721

[22] Filed: Oct. 10, 1986

[51] Int. Cl.$^4$ .............................................. H01S 3/10
[52] U.S. Cl. ..................................................... 372/33
[58] Field of Search ................... 372/12, 13, 18, 19, 372/20, 33, 53, 54, 92–94, 98

[56] References Cited

U.S. PATENT DOCUMENTS

| | | | |
|---|---|---|---|
| 3,675,151 | 7/1972 | Mack | 372/1 |
| 3,703,687 | 11/1972 | Maydan | 372/19 |
| 3,904,987 | 9/1975 | Cheng | 372/13 |
| 4,479,220 | 10/1984 | Bor et al. | 372/25 |
| 4,485,473 | 11/1984 | Tang et al. | 372/18 |
| 4,646,308 | 2/1987 | Kafka et al. | 372/25 |

FOREIGN PATENT DOCUMENTS 2157484A  4/1985  United Kingdom .

OTHER PUBLICATIONS

A. Scavennec, "Experimental Study of a Continuously Pumped, Actively Mode-Locked Dye Laser", Mar. 1977, pp. 335-338; vol. 20 #3 Optics Communications.

Primary Examiner—William L. Sikes
Assistant Examiner—B. R. R. Holloway
Attorney, Agent, or Firm—Limbach, Limbach & Sutton

[57] ABSTRACT

The subject invention relates to method of suppressing one of the counterpropagating intracavity pulses generated in a dye laser synchronously pumped by the output of a mode locked Q-switched pump laser. The method includes extracting a portion of one of the pulses generated in the cavity such that the other pulse experiences a greater effective gain. The pulse with the highest effective gain will dominate the other pulse and at the steady state only one pulse will exist in the cavity. In the preferred embodiment, a double pass acousto-optic cell is used to extract the both the unwanted pulse and, at a later time, the high energy, useful pulse. In this case, maximum efficiency is achieved by placing the dye cell at one of a number of well defined locations within the optical cavity.

9 Claims, 3 Drawing Sheets

SUPPRESSION OF THE SECOND INTRACAVITY PULSE IN A SYNCHRONOUSLY PUMPED DYE LASER

TECHNICAL FIELD

The subject invention relates to an improvement in high energy, short pulsed, tunable dye lasers. An improved method is disclosed for suppressing one of the two intracavity pulses generated in a dye laser which is synchronously pumped by the output of a mode locked, Q-switched pump laser.

BACKGROUND OF THE INVENTION

In the last few years, scientists have been performing spectroscopic analysis of matter using high energy pulses from a laser. An effort is made to study changes in materials which occur during extremely short periods of time, in the pico and sub-picosecond range.

As research has progressed, a desire for higher power lasers has developed. The availability of higher power lasers permits investigation of higher order, nonlinear effects in materials subjected to the laser excitation. A wide variety of wavelengths of laser light is also desired to expand the range of spectral analysis. As will be discussed below, lasers designed to produce a higher output power and greater spectral range have more constraints which give rise to certain operational difficulties. In the past, the suppression of the second pulse in a cavity could be easily handled. However, the solutions available in the past have not proved feasible with the higher powered systems.

ORIGIN OF DOUBLE PULSING

Referring to FIG. 1, there is illustrated a basic schematic diagram of a dye laser 10 which is pumped by another laser. The dye laser 10 includes a dye cell 12. A fluid, having an organic dye therein, flows through the dye cell. A laser cavity is defined by a pair of end mirrors 14 and 16. The pump laser 18 is mode locked and has a cavity length that is substantially equivalent to the cavity of the dye laser. In this manner, the pump laser will generate light pulses of energy at a frequency having a period equivalent to the round trip time in the cavity of the dye laser.

In operation, light pulses from the pump laser 18 are supplied to the dye cell 12. At the beginning of the pulse train, light is spontaneously emitted by the dye medium in all directions. That portion of the light which is intercepted by the mirrors forming the optical resonant cavity will participate in an oscillation buildup. As long as the dye cell is placed somewhere between the two mirrors, the bursts of fluorescence emitted from the dye cell will be reflected back toward the amplifier medium creating two counter propagating light pulses (labeled L and R in FIG. 1).

As each pulse makes a full round trip within the cavity, it will return to the dye cell in time to experience another energy increase from a subsequent pulse from laser 18. Where the dye cell medium is homogeneous, both pulses will compete for the same amplification energy. In this case, the energy per pulse will be significantly smaller than in a situation where only a single pulse is taking full advantage of the available amplification.

As noted above, researchers are interested in very high energy, short pulses. Therefore, it is desirable to eliminate one of the two pulses in the cavity so that all of the available energy can be concentrated in one pulse. Another important reason for limiting the laser to one pulse is that the extractor used to remove the pulse from a standard sized cavity can be operated only about as fast as the time of one-half round trip in the cavity. Thus, if two pulses were present in the laser, it would be difficult to isolate only one of the pulses. Single pulse performance is a requirement in many experiments.

PRIOR ART AND SECOND PULSES

As noted above, the existence of a second pulse in a laser cavity has not been a problem in the prior art. It has been found that if one of the two counter propagating pulses created in the cavity experiences an effective gain (defined as the product of gain times losses) different than the other pulse, the pulse which sustains the highest effective gain will take over the other one, and at a steady state, only a single pulse will exist in the cavity. It has been suggested that this selection process or pulse discrimination is the result of a saturation effect in the gain medium.

In the prior art systems, it was relatively easy to insure that one of the two pulses experienced a higher effective gain. This result was achieved by insuring that one of the two pulses re-crossed the dye medium before the other and at a time during which there was some leftover gain in the dye medium.

One approach used to satisfy this criteria was to locate the dye cell close to one end of the cavity as shown in FIG. 1. In this configuration, the L pulse will return to the dye cell 12 (after hitting mirror 14) sooner than the R pulse (after hitting mirror 16). If the dye cell has some residual amplification left from the last pulse of pump energy, the L pulse will utilize some of this leftover gain, creating an imbalance between the L and R pulses. The two pulses will then continue on to complete a full round trip in the cavity and meet back at the dye cell 12. At this time, the next pump pulse will have re-excited the medium and the stronger L pulse will utilize more of the energy in the cell, creating an even greater imbalance. The L pulse will continue to utilize more of the available pump energy on each round trip until a steady state is created where only the L pulse exists and the R pulse is extinguished.

Insufficiencies of the Prior Art

The approach used in prior art was effective as long as one could position the dye cell 12 close enough to an end mirror so that one of the pulses will return to the dye cell before all of the gain has decayed. Two factors have combined to make this solution inapplicable to newly developed systems. Referring to FIG. 2, another schematic diagram of a dye laser is shown. This dye laser differs from the one shown in FIG. 1 in that it includes a double pass pulse selector 22 at one end and a grating 24 at the other end. A pulse selector is used to extract and separate single pulses from an ultra fast laser. As discussed below, the characteristics of this type of pulse selector require that it be mounted at the end of the laser cavity, near a mirror.

A Littrow mount grating 24 is affixed to the end of the cavity. Grating 24 allows the wavelength of the emitted laser radiation to be tuned. If the grating were mounted within the cavity, each time the grating was moved, the cavity would have to be retuned.

In a system having this configuration, the dye cell 20 must be mounted relatively far from the ends of the cavity. This restriction arises because the diameter of the laser beam in the cavity (and hence the beam energy density) must be specifically tailored for each different element. For example, the beam diameter must be set at about 20 microns when it crosses the pulse selector to maximize the extinction ratio of the device. The extinction ratio is defined as a comparison between the amount of energy extracted from the selected pulse and the residual energy extracted from any unselected pulse.

When the beam reaches the grating, it should have a diameter of 90 microns for efficient frequency selection. In contrast, the beam must be relatively unfocused when it hits the dye cell and should have a diameter of about 150 microns. The focus of the beam throughout the cavity is modified by the internal mirrors 26 and 28. As can be appreciated, these restrictions limit the position of the dye cell to a location somewhere between mirrors 26 and 28, rather than out closer to ends which would more readily assure the gain imbalance necessary to suppress the second pulse.

Even with the arrangement shown in FIG. 2, the second pulse could still be suppressed if the lifetime of the dye in the cell was long enough to permit one of the pulses to return to the cell before the gain has decayed. For example, under many conditions, the relatively common R6G dye could be utilized as long as the pumping energy was not too high. However, with other dyes (such as stilbene 3, a blue dye), the lifetime can be so short that the second pulse cannot be suppressed simply by relocating the dye cell in the limited space available in the cavity. The blue dyes are particularly desirable for experiments at shorter wavelengths. Even the R6G dye lifetime was found to be too short under certain pumping conditions.

Accordingly, it is an object of the subject invention to provide a new and improved means for suppressing the second intracavity pulse in a laser.

It is another object of the subject invention to provide a new and improved apparatus which generates high energy, ultra short pulses.

It is a further object of the subject invention to provide a new and improved method for suppressing the second intracavity pulse in a dye laser synchronously pumped by the output of a mode locked Q-switched laser.

It is still a further object of the subject invention to provide a new and improved method for suppressing a second intracavity pulse in a dye laser where the lifetime of the dye is extremely short.

It is still another object of the subject invention to provide a method of suppressing the second intracavity pulse in a dye laser by extracting a portion of the energy of the unwanted pulse utilizing a pulse selector.

It is still a further object of the subject invention to provide a method of suppressing the second intracavity pulse in a dye laser which will operate with a double pass acousto-optic cavity dumper.

SUMMARY OF THE INVENTION

In accordance with these and many other objects the subject invention provides for an improved laser system where one of a pair of pulses generated in the resonant cavity is suppressed, maximizing the available amplification energy for single pulse operation. In the preferred embodiment, the high power laser is defined by a dye laser which is synchronously pumped by a Q-switched, mode locked neodynium:YAG laser. The dye laser includes a flowing dye cell, one end mirror and an opposed grating to define the resonant cavity. A pulse extractor is provided in the form of a cavity dumper. Where high pulse repetition rates are desired, an acousto-optic dumper is used. As in the prior art, the pulse extractor is used to dump single pulses from the cavity.

In accordance with the subject invention, the cavity dumper is also used to extract a portion of the energy from one of the two counterpropagating pulses in the cavity. By this arrangement, an energy imbalance is created between the two counterpropagating pulses such that at the steady state, the stronger pulse will dominate and take all of the gain from the amplifier medium, while the pulse from which energy has been extracted will become extinguished. The loss created by the cavity dumper has to be introduced into the system during a time period shorter than the round trip time in the cavity or no imbalance will be created. Preferably, the extraction of energy from one of the pulses will occur early in the pulse train in the Q-switched envelope. By this arrangement, the energy extracted can be relatively small and therefore easily dissipated such that more energy will be available for the main pulse. The method for adjusting the processor to extract a pulse early in the pump pulse train will be described in greater detail below.

In the preferred embodiment, a double pass acousto-optic cavity dumper s used to achieve a high extraction repetition rate and to maximize extraction efficiency. To synchronize the different elements, the radio frequency (RF) output of the mode locker driver is supplied to the mode locker head of the pump laser, the Q-switch driver and to a timing device controlling the cavity dumper. In this configuration, the triggering of the cavity dumper will be simplified if the location of the dye cell is restricted to a few positions in the cavity. The criteria used to determine the position of the dye cell is discussed below.

Further objects and advantages of the subject invention will become apparent from the following detailed description taken in conjunction with the drawings in which:

DETAILED DESCRIPTION OF THE PREFERRED EMBODIMENT

Figure 3:
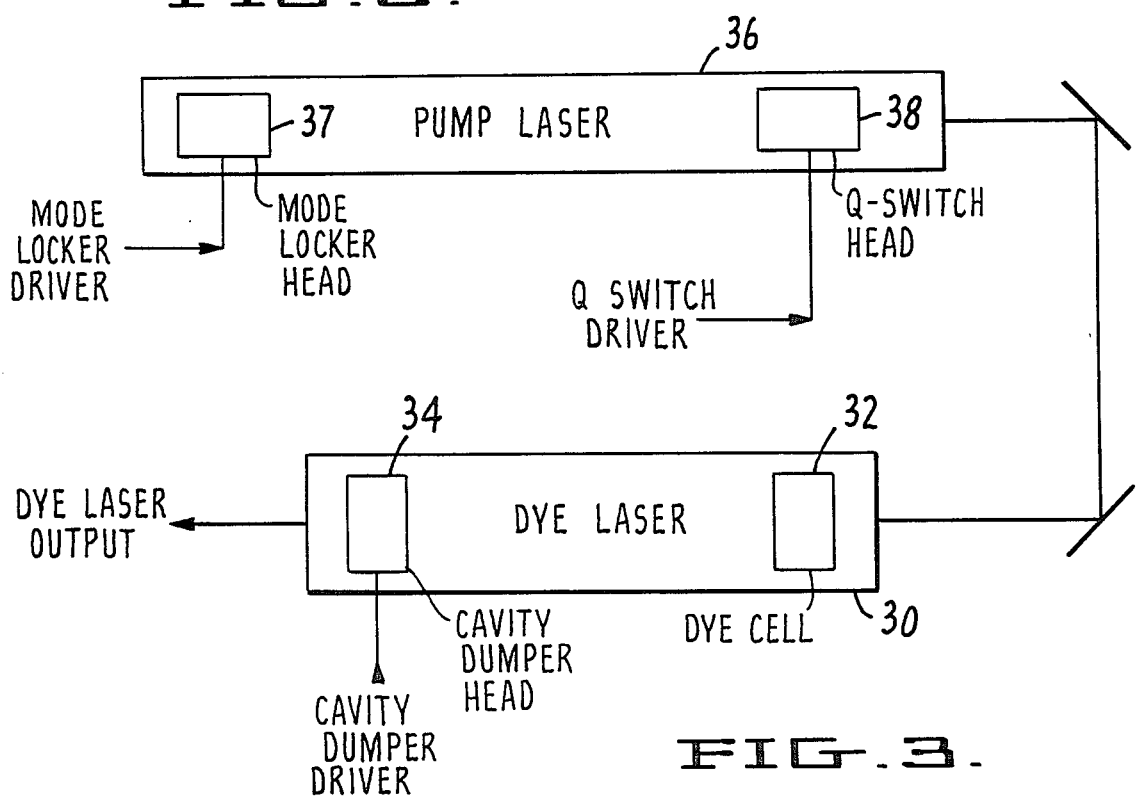
FIG. 3 is a schematic diagram of the laser system of the subject invention.

Referring first to FIG. 3, there is illustrated the main component parts of the subject invention. In the preferred embodiment, the primary laser is a dye laser 30 having an amplifying medium in the form of a dye cell 32 located therein. It is possible that the subject invention may find utility with other types of lasers, such as a color center laser, which uses a crystal as the amplifying medium. The dye laser further includes a cavity dumper 34 in the form of an acousto-optic cell. An electro-optic cell could be utilized if lower pulse repetition rates are acceptable. The cavity dumper is used to extract a portion of the energy from the unwanted pulse as well as to extract the energy of the high energy pulse later on in the Q-switched cycle.

FIG. 3 also illustrates a laser 36 used to pump the dye laser. This pump laser 36 must be mode locked. Mode locking insures that a series of discrete pulses are generated with a period corresponding to the round trip time in the pump laser cavity.

In order to increase the energy per pulse, it is desirable to operate the pump laser in a Q-switch mode. By operating the laser with the Q-switch, a finite train of pulses will be generated having a higher energy than if the Q-switch were not utilized. It should be understood that the use of a Q-switch is not necessary for the performance of the subject invention. As shown in FIG. 3, in the preferred embodiment, the pump laser 36 has both a mode locker head 37 and a Q-switch head 38.

Figure 4:
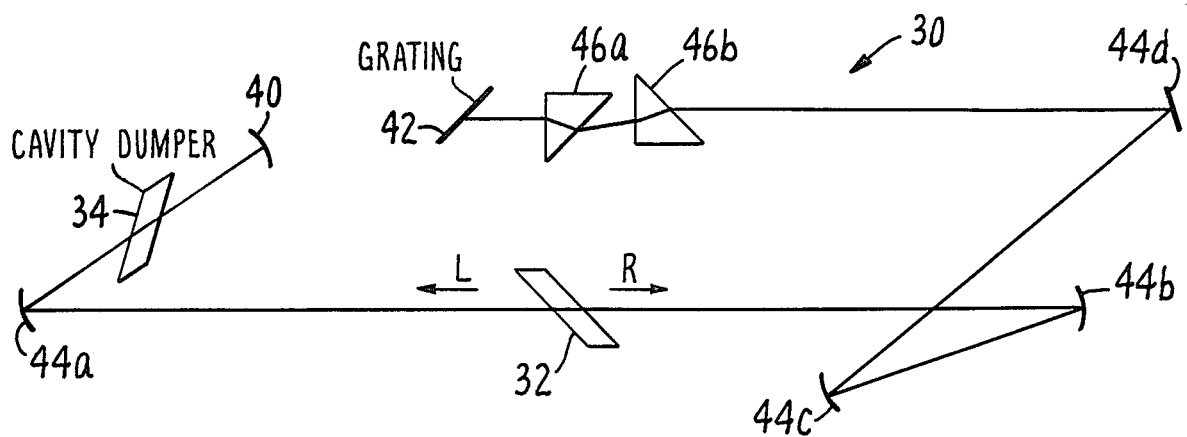
FIG. 4 is a schematic diagram of the resonant cavity of the dye laser of the subject invention.

Turning to FIG. 4, there is illustrated, in schematic form, the resonant cavity of the dye laser 30. As pointed out above, the dye laser cavity includes the amplifier cell 32 and the cavity dumper 34. The ends of the resonant cavity are defined by a mirror 40 and the grating 42. A number of mirrors 44a through d, are provided for bending the beam and adjusting its diameter along the legs of the resonant cavity. The high energy of the beam forces the dye cell 32 to be in an unfocused arm to achieve the shortest pulse durations.

In the preferred embodiment, a double pass cavity dumper is utilized. This device must be placed next to one end of the optical cavity since an immediate reflection of the beam is necessary to redirect the beam back through the device thereby maximizing extraction. A double pass cavity dumper can achieve an extraction efficiency in the range of 50-70% while a single pass extractor operates at only a 20-40% efficiency.

The other end of the optical cavity is closed by the tuning element consisting of one or more beam expanding prisms 46a and b and the grating itself 42. As discussed above, the need to position the cavity dumper and the grating at the ends of the cavity, in arms having a beam diameter very different from that needed by the dye cell, requires that the dye cell be placed far from the cavity ends. When relatively short lifetime dyes are used, any gain leftover in the dye cell after the initial pulses are generated will decay before either of the two emitted pulses (R or L) ever recross the amplifier medium after reflecting off the ends of the resonant cavity. The decay time of the upper level of the dyes generally used as the amplifier medium is on the order of several nanoseconds and are therefore smaller than the usual cavity round trip time which is on the order of 10 nanoseconds. Blue dyes, having even shorter lifetimes in the upper state, are therefore more susceptible to double pulsing operation in this configuration.

Figure 6:
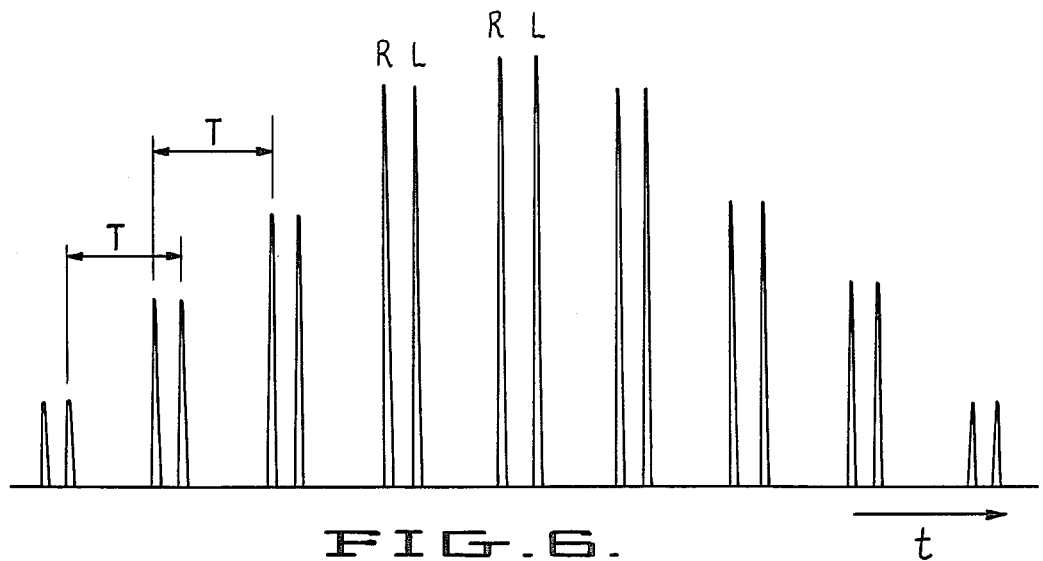
FIG. 6 is an illustration showing the light energy present in the dye cavity when the second intra cavity pulse is not suppressed.

An illustration of the existence of the second pulse in a cavity can be seen by referring to FIG. 6. This illustration is comparable to what would be seen if a fast photodetector was used to monitor the leakage of the intracavity power through one of the mirrors 44 forming the dye laser cavity and the output were displayed on a fast oscilloscope. The signal given by the photodetector exhibits two trains of pulses. Each train is periodic with the period corresponding to the round trip time T in the dye cavity.

In the method of the subject invention, the cavity dumper 34 is used to create an energy imbalance between the two pulses which leads to a steady state, single intracavity pulse operation. The cavity dumper therefore has two functions in the present system. It is used as a loss control device at the beginning of the pulse formation to force single pulse operation and as a pulse selector several round trip times later to eject out of the laser cavity the pulse used as the laser output.

Figure 7:
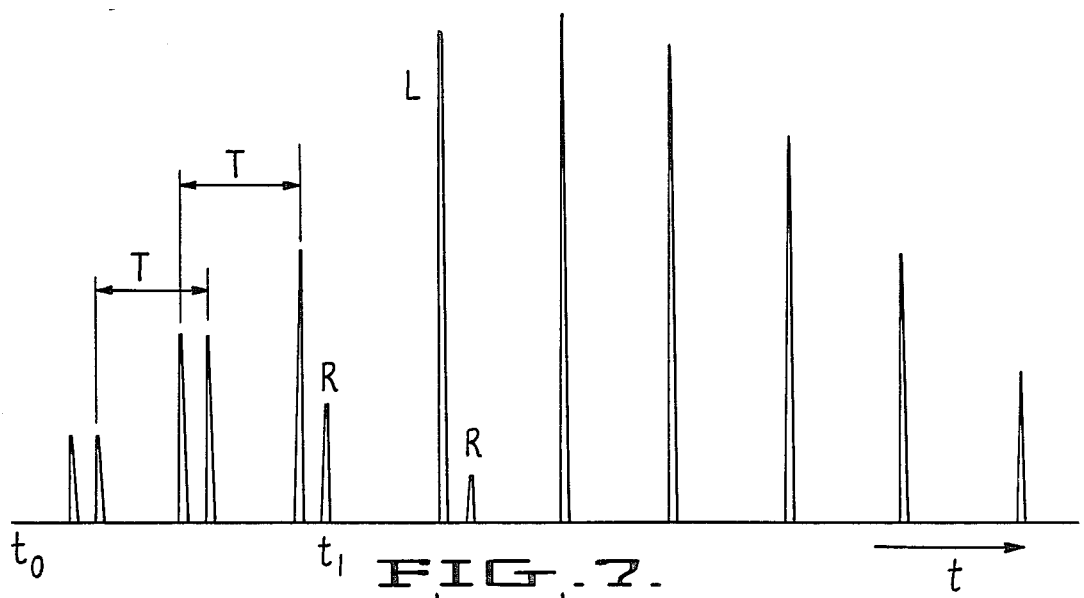
FIG. 7 is an illustration, similar to FIG. 6, showing the second pulse suppressed.

The timing of the first actuation of the cavity dumper is adjusted to select one pulse at the beginning of the pulse train in the Q-switched envelope. FIG. 7 illustrates what would be observed on a oscilloscope when a portion of the energy of the R pulse is extracted at time $t_1$. It can be seen that shortly after time $t_1$, a steady state is reached, where the R pulse disappears entirely and the L pulse is dominant. It should be noted that the entire energy of the R pulse need not be extracted for the subject invention to operate. Indeed, even the best high speed cavity dumpers can only achieve 50-70% power reduction. It is important only that a significant imbalance of energy be created so that other effects in the dye laser can cause the extinction of the extracted pulse and the domination of the remaining pulse.

Figure 8:
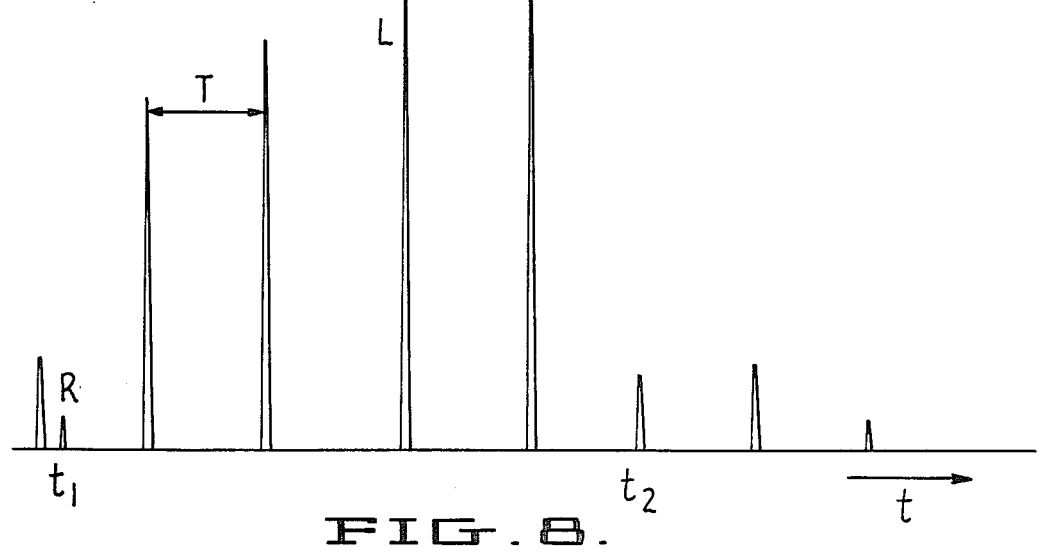
FIG. 8 is an illustration, similar to FIG. 7, showing the second pulse being suppressed at the beginning of the pulse train in Q-switched envelope and the main pulse being extracted at time $t_2$.

The process is optimized if the pulse is extracted early in the pulse train. By extracting the pulse early, two benefits are achieved. The first benefit is that virtually the entire amplifying energy in the dye cell can be used to amplify the remaining pulse. Additionally, the energy coupled out by the cavity dumper during the first extraction is minimized. It should be noted that in most ultra fast experiments, very little can be done to redirect the unwanted extracted light. As long as the unwanted extracted pulse is of relatively low energy, experiments will not be detrimentally affected. It has been found that with a pump laser providing 30 pulses in its Q-switched envelope and an energy on the order of 100 microjoules in the most energetic main pulse, effective single pulse operation can be achieved by coupling out of the dye laser an initial pulse having less than 1% of the energy of the useful main pulse coupled out several round trip times later. This result is depicted in FIG. 8.

This optimization is achieved by first setting the timing of the cavity dumper to select one pulse as shown in FIG. 7. The time delay between the initial triggering of the Q-switched envelope (time $t_0$) and the actuation of the cavity dumper, (time $t_1$) can then be decreased by steps equal to the round trip time (T) in the cavity. The shortening of the delay period by a time T will result in the desired pulse being extracted one round trip earlier in the train. Since the time T is known, the delay between time $t_0$ and $t_1$ can easily be shortened by this amount. The delay is shortened in a step-by-step manner until the second pulse reappears. The delay is then increased one round trip time T, extinguishing the desired pulse in the most efficient manner.

In the preferred embodiment of the subject invention, where the cavity dumper is a double pass acousto-optic cell, and the pump laser is Q-switched, additional criteria must be observed to insure that the system is properly synchronized. The double pass cavity dumper has the advantage of a larger diffraction efficiency because of the doppler shifts involved in the acousto-optic deflections and the interference effects produced. The diffraction efficiency is a sinusoidal function of time with a frequency equal to twice the frequency of the radio frequency (RF) power used to drive the acoustic optic cell. For optimum efficiency, the phase and delay of the acoustic optic cell are adjusted to extract energy from the unwanted pulse at time $t_1$. In order to have the high energy pulse properly extracted later on in the Q-switched envelope, the dye cell must be properly located in the cavity to match the operation of the cavity dumper. If the location was not properly set, the phase and delay of the cavity dumper would have to be readjusted before extracting the second pulse.

Since the phase and delay of the cavity dumper is fixed to maximize the extraction of the R pulse at time $t_1$, the most efficient time ($t_2$) to actuate the cavity dumper to extract the maximum high energy pulse is given by the following equation:

$$t_2 = t_1 + k_1 T + k_2 T/N \qquad (1)$$

where $t_1$ is the time when the cavity dumper was first actuated to extract a portion of the R pulse, T is the round trip time in the cavity and N is an integer number equal to the ratio of the frequency of the RF power supplied to the cavity dumper with respect to the frequency of the RF power supplied to mode locker of the pump laser (usually on the order of 10). $k_1$ and $k_2$ are integer numbers. $k_1$ is selected so that the number of round trips will produce a maximum energy output pulse. $k_2$ is selected to provide a convenient location for the dye cell in the resonant cavity.

From equation (1) it can be seen that under the optimum conditions for coupling out both pulses at times $t_1$ and $t_2$, the time delay or offset time $t_{offset}$ separating the R and L pulses at the cavity dumper location is given by $$t_{offset} = k_2 T/N \qquad (2)$$

Figure 1:
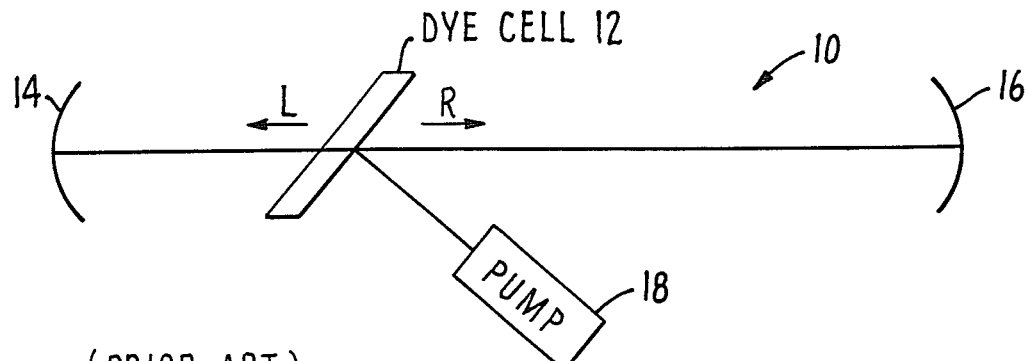
FIG. 1 is a simplified schematic diagram of a optically pumped dye laser of the prior art.
Figure 2:
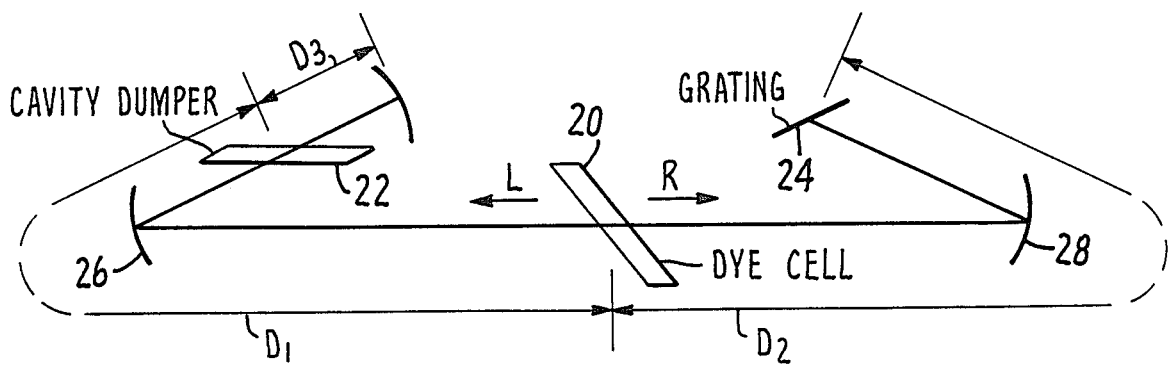
FIG. 2 is a simplified schematic diagram of a dye laser of the prior art having a cavity dumper and a grating;.

$T_{offset}$ can also be defined in terms of the locations of the dye cell and the cavity dumper in the cavity. Referring again to the simplified diagram of FIG. 2, it will be seen that the L pulse will travel the distance from the dye cell 20 directly to the cavity dumper 22 in a time $D_1/c$, where c equals the speed of light. The R pulse will first reach the cavity dumper 22 only after it has reflected off grating 24 and thus will travel a distance $2D_2 + D_1$. The R pulse will take a time $2D_2/c + D_1/c$ to cover this distance. The offset time $t_{offset}$ can therefore also be defined as:

$$t_{offset} = (2D_2 30\ D_1)/c - D_1/c = 2D_2/c \qquad (3)$$

By combining equations (2) and (3) it will be seen that:

$$t_{offset} = 2D_2/c = k_2 T N \qquad (4)$$

or $$D_2 = k_2 T c/2N. \qquad (5)$$

Equation (5) provides the optimum placement of the dye cell 20 within the laser cavity as measured from the grating 24. Equation (5) can be generalized to give the distance D of dye cell to either end of the cavity as follows:

$$D = kTc/2N \qquad (6)$$

Since N is an integer number larger than 1, there are generally $N-1$ possible locations for the dye cell in the cavity when the two end positions are ignored.

As an example, in a model 740 dye laser marketed by Coherent, Inc., the assignee of the subject invention, a cavity length is set a 1.97 meters, 1/T is on the order of 76 MHz and $N=10$. Nine possible cell locations are possible when the two end positions are disregarded. Among the nine possible positions, only two displaying the required beam radius for the dye cell are usable. These two occur at a distance $D_2 = 1.182$ meters and $D_2 = 1.379$ meters from the grating, corresponding to $N=6$ and $N=7$.

Figure 5:
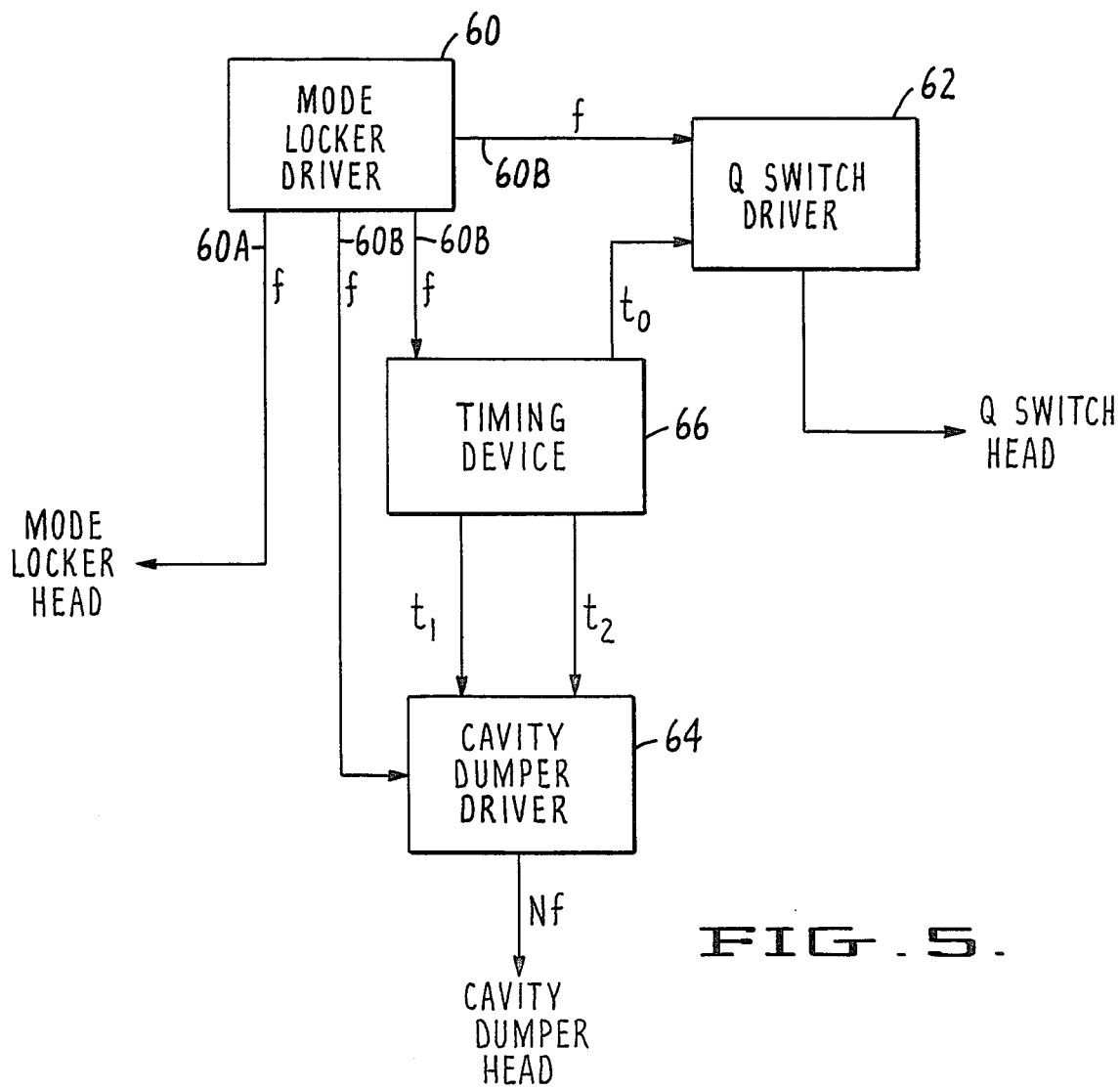
FIG. 5 is a schematic diagram illustrating the electrical arrangement of the component drivers of the subject invention.

Referring to FIG. 5, the electronic timing of the subject invention is illustrated. In the subject invention, an RF oscillator located in the mode locker driver 60 is used as a reference clock. The main output $60_A$ of the mode locker driver is supplied to the mode locker head of the pump laser 36 at a frequency f thus providing a 2f pulse rate at the pump laser output. A secondary output $60_B$ at frequency f is used to control the rest of the electronics such that every event in the synchronously pumped laser occurs at a multiple or submultiple frequency of this frequency f. The output of the mode locker driver is also supplied to the Q-switch driver 62. A portion of the RF signal from the mode locker driver is amplified by the Q-switch driver to generate the required level of RF excitation for the Q-switch.

The cavity dumper driver 64 also must generate an RF signal based on the input from the mode locker driver 60. This frequency is at a multiple of f and is generated by a voltage controlled oscillator, phased locked on the N times multiplied output from the mode locker driver. The value of N is preferably chosen to be around 10.

Timing device 66 has an input from the mode locker driver 60 and supplies trigger signals to both the Q-switched driver and the cavity dumper. The timing device 66 functions to trigger both the Q-switch driver and the cavity dumper. Using frequency divider circuitry, a low frequency signal at a sub-multiple of the frequency f is derived to trigger the Q-switched cell. As illustrated in FIG. 7, this triggering event can be considered $t_0$.

In order to force single pulse intracavity operation in the dye laser as well as to extract the single high energy output pulse, the cavity dumper is activated twice during the Q-switched envelope. The two triggering signals are labeled $t_1$ and $t_2$. The triggering signals are obtained from the timing device 66 using counting circuitry to generate the proper adjustable time delays from the reference clock in the mode locker driver 60.

At time $t_1$, a first triggering signal is sent to the cavity dumper driver 64. By adjusting the phase of the RF signal at frequency Nf generated by the phase locked internal oscillator as well as the delay time provided by the timing device, the cavity dumper can be set for maximum extraction of the intracavity pulse to be suppressed. A second triggering signal is provided at a later time $t_2$ which occurs at time $t_1 + k_3/2Nf$ where $k_3$ is an integer number. The proper choice of the $k_3$ value is associated with the dye cell location in the laser cavity as described above with reference to equations (2–6).

In summary, there has been provided a new and improved method and apparatus for suppressing one of two counterpropagating intracavity pulses in a dye laser. In the subject system, part of the energy of one of the pulses is coupled out at an early stage such that as a steady state approaches, the remaining pulse will dominate and amplification will be maximized creating a short, high energy, useful pulse.

While the subject invention has been described with reference to a preferred embodiment, it is apparent that various changes and modifications could be made therein, by one skilled in the art, without varying from the scope and spirit of the subject invention as defined by the appended claims.

We claim:

1. A laser comprising:
   a resonant cavity;
   an amplifying medium located in the resonant cavity;
   source means for periodically introducing pulses of pump energy into the amplifying medium such that two counterpropagating pulses are generated in the cavity;
   means for extracting energy from the resonant cavity; and
   timing means functioning to trigger the operation of the extracting means a first time and being programmed to cause the extracting means to extract some of the energy from one of the two counter propagating pulses in the cavity thereby creating an energy imbalance between said counter propagating pulses such that the energy from subsequent pump pulses will be transferred primarily to the remaining pulse in the cavity from which no energy has been extracted and wherein said timing means further functions to trigger the operation of the extracting means a second time to extract said remaining pulse after the energy of said subsequent pump pulses has been transferred thereto.

2. A laser as recited in claim 1 wherein said source means is defined by a mode locked laser.

3. A laser as recited in claim 2 wherein said source means is Q-switched.

4. A laser as recited in claim 1 wherein said amplifying medium is defined by a dye cell.

5. A laser as recited in claim 1 wherein the amplifying medium is homogeneous.

6. A laser as recited in claim 1 wherein said extracting means is defined by a double pass acoustoptic cavity dumper.

7. A laser as recited in claim 6 wherein the source means is a pump laser, said pump laser including a mode locker and a Q-switch and the amplifying medium is a dye cell and said dye cell is located a distance D from one end of the resonant cavity an amount equal to:

$$KTc/2N$$

where K is an integer number, T is the round trip time of light in the cavity, c is the speed of light and N is the ratio of the frequency of the RF power supplied to the cavity dumper with respect to the frequency of the RF power supplied to the mode locker of the pump laser.

8. A method of operating a pulsed laser having an amplifying medium in a resonant cavity, said method comprising the steps of:
   (a) periodically exciting the amplifying medium to create two counterpropagating pulses in the cavity;
   (b) performing a first extracting step wherein a portion of the energy of one of the two counter propagating pulses in the cavity is extracted to create an energy imbalance such that one pulse is stronger than the other pulse;
   (c) continuing to periodically excite the amplifying medium such that the stronger pulse is strengthened while the weaker pulse is substantially extinguished; and
   (d) thereafter, performing a second extracting step wherein the stronger pulse is extracted from the cavity.

9. A method as recited in claim 8 wherein the timing of the extracting step (b) is controlled such that the number of times the amplifying medium is periodically excited in step (a) is less than the number of times the amplifying medium is periodically excited in step (c).

* * * * *